F. KLEINSCHMIDT.
METHOD OF PRESERVING LIVE FISH DURING LONG PERIODS OF TRANSPORT OR IN STORE.
APPLICATION FILED DEC. 28, 1903.
899,057.
Patented Sept. 22, 1908.
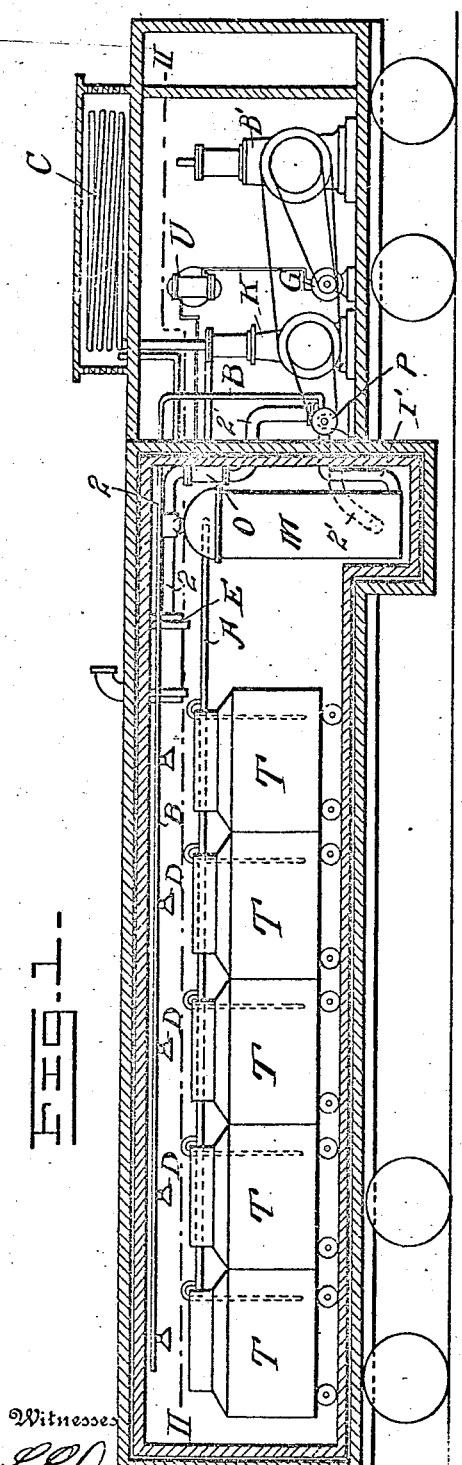
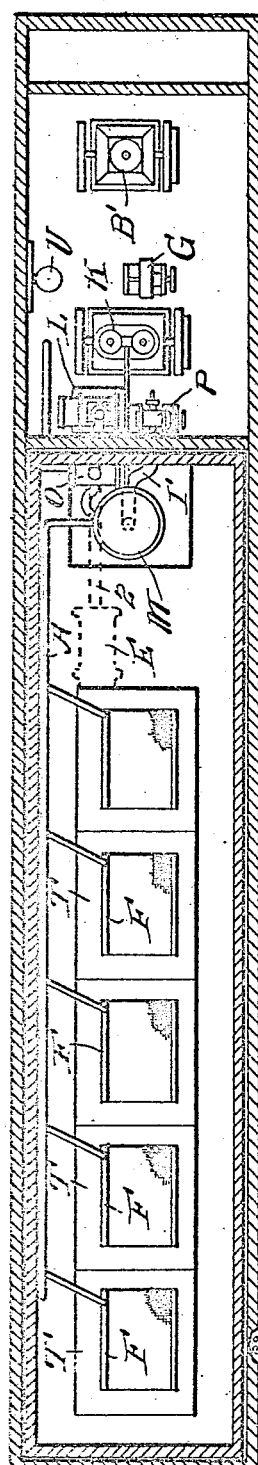

UNITED STATES PATENT OFFICE.

FRIEDRICH KLEINSCHMIDT, OF BUCHAREST, ROUMANIA.

METHOD OF PRESERVING LIVE FISH DURING LONG PERIODS OF TRANSPORT OR IN STORE.

No. 899,057.　　　　　Specification of Letters Patent.　　　Patented Sept. 22, 1908.

Application filed December 28, 1903. Serial No. 186,899.

*To all whom it may concern:—*

Be it known that I, FRIEDRICH KLEINSCHMIDT, a subject of the King of Prussia, and resident of Bucharest, Roumania, have invented new and useful Improvements in the Methods of Preserving Live Fish During a Long Period of Transport or in Store, of which the following is a specification.

This invention relates to a method of preserving live fish during transportation, or in storage, and has for its object to improve the methods heretofore used. Such methods consisted chiefly in ventilating the tank, or tanks, in which the fish are kept and in injecting oxygen; filters being used to remove the impurities. However, experience has shown that it is not so much the impurities in the water which prove injurious to the fish as the lack of oxygen; and this knowledge has led to the regeneration of the water mainly by injecting oxygen or air. However, these improved methods of keeping fish alive during transportation, or in storage, have not proved satisfactory, for the reason that the effect of the injection of air or oxygen is of very short duration, making repeated renewals of the water necessary.

The purpose of my improved method is to keep the water well saturated with oxygen and in a sufficiently oxidized condition for respiration and to preserve the fish alive.

According to my invention, I regenerate the water containing the fish by continuously bringing it into contact with ozone; thereby supplying at all times a sufficient quantity of oxygen, the ozone, in some manner, neutralizing or destroying the respiration products eliminated from the fish. As long as the water is regenerated by ozone in this manner the fish can be kept alive in it indefinitely.

My improved method, therefore, consists in filling tanks, or receptacles intended for receiving the fish to be preserved, with water in which the fish have lived, and in continuously subjecting the water to the action of ozone, whereby oxygen is continuously supplied thereto, sufficient in quantity to keep the water in the state favorable to the preservation of the fish; organic impurities being removed or retained in any desired way by surface filters. Water being continuously regenerated by the ozone, asphyxiation of the fish by carbon dioxid, as in former methods of preservation, is entirely obviated.

In order to secure the full advantages of my method, it is necessary to keep the fish perfectly quiet in the water. To this end, the temperature of the water containing the fish is kept very low; by which means the number of fish carried in one receptacle can also be greatly increased; the ratio between the quantity of fish and the quantity of water being as high as 1:1. This means a considerable decrease in the dead weight to be carried as compared with the methods heretofore used, in which the ratio is about 1:5. A double advantage is, therefore, adherent in my new method; as not only is the time during which the fish can be kept alive practically unlimited, but the number of fish which can be carried in each tank is greatly increased.

My method can be used on railroad cars, vessels, and other means of transportation as well as in fish markets and other places of storage.

In the accompanying drawings, Figure 1 shows in vertical section a railroad car provided with apparatus for carrying out my method, and, Fig. 2 is a horizontal section along the irregular broken lines II—II of Fig. 1.

The car contains two compartments, one of which is used for the operating means; the other containing a water regenerating apparatus M, an air-drying apparatus E, and the fish tanks T. The latter compartment is provided with insulation in order to keep the temperature low by preventing the radiation of heat into the compartment. The water regenerating apparatus M is closed and provided at its upper end with an opening communicating with the air duct 2. In the lower portion of the tower M, the ozone is admitted by the pipe 2', and still nearer the bottom of the tower a water discharge opening is provided, which is connected by the pipe I' with the pump P. The admission of the water is effected by a partial vacuum produced by the air pump L, by reason of the slight resistance to the incoming air in the air filter E, hereinafter described. Outside air is drawn into the tower M by the air pump L, passing on its way through the drying and filtering apparatus E, to conduit 2 and the ozonizing apparatus O, from which it is supplied to the tower through the conduit 2'.

Through a branch of the conduit 2, the tower is continuously exhausted, and the gas mixture leaving said tower is deprived of its carbon dioxid in any desired manner as by passing it through a receptacle containing substances adapted to absorb the carbon dioxid, and is used to further cool the air drawn in through the conduit 2. On account of the slight vacuum in the tower the water from the tanks T passes into it by a pipe A, or in some other similar manner, and, as already described, is finely divided and distributed in the tower. As the ozonized air is supplied to the tower near the bottom, the water is subjected to its action during the time it is falling the length of the tower. Thus regenerated, it is drawn off by means of the pump P, and is returned through the pipe B and nozzles D to the tanks. In the top of each tank is a filter F for retaining sediment and precipitates difficult to decompose.

The gas mixture resulting from the water regeneration can be further utilized; by which means energy is saved for ozonizing and cooling the water. This mixture is still comparatively rich in ozone after having acted on the water; but it cannot be used again directly, as it contains the carbon dioxid which it has absorbed during the regenerating process. Therefore, in order to fit the gas for further use, and prevent losses of energy, the carbon dioxid must be removed from the mixture as above described. By using the thus purified fluid for the further regeneration of the water, conducting the same through the conduits 2 and the pump L, the volume of ozonized air drawn in by the pump will be automatically regulated according to the demand for regeneration. It has been found that the gas, after having given off the carbon dioxid, contains a larger amount of oxygen than before and is therefore even better suited for further use in regenerating the water.

A compressor K and surface condenser for condensing and liquefying the gas for cooling the car are provided. The electrical energy for operating the ozonizer is furnished by a dynamo G connected to a transformer U, and the power for driving the dynamo and compressor is obtained from an engine B'.

What I claim and desire to secure by Letters Patent is:

1. The method of preserving live fish during transportation or in storage, which consists in continuously drawing off water from the tank containing the fish, bringing it into intimate contact with ozone thereby regenerating it, and returning the regenerated water to the fish tank; thus maintaining a continuous circulation through said tank.

2. The method of preserving live fish during transportation or in storage, which consists in drawing off water from a tank containing the fish, and bringing it into intimate contact with ozone, returning the regenerated water to the tank and maintaining the water of the tank at a low temperature to control the movements of the fish.

3. The method of preserving live fish during transportation or in storage, which consists in supplying to a tank containing the fish a quantity of water in which the fish have lived, substantially equal to the quantity of fish in said tank, continuously drawing water from the tank, regenerating it by bringing it into intimate contact with ozone, and returning the regenerated water to the tank; substantially as described.

In testimony whereof I have hereunto set my hand in presence of two subscribing witnesses.

FRIEDRICH KLEINSCHMIDT.

Witnesses:
JERGE DONATE,
WILHELM REUNER.